US006370225B1

(12) United States Patent
Telymonde

(10) Patent No.: US 6,370,225 B1
(45) Date of Patent: Apr. 9, 2002

(54) IMAGE RECEPTOR FOR AN X-RAY APPARATUS

(75) Inventor: Timothy D. Telymonde, Keyport, NJ (US)

(73) Assignee: Caresbuilt Inc., Keyport, NJ (US)

( * ) Notice: Subject to any disclaimer, the term of this patent is extended or adjusted under 35 U.S.C. 154(b) by 0 days.

(21) Appl. No.: 09/749,228

(22) Filed: Dec. 27, 2000

(51) Int. Cl.[7] .................................................. H05G 1/64
(52) U.S. Cl. ................ 378/98.2; 378/98.3; 250/370.09; 250/487.1
(58) Field of Search ............................... 378/98.2, 98.3, 378/98.8, 185, 44; 250/370.09, 487.1, 370.12, 370.13

(56) References Cited

U.S. PATENT DOCUMENTS 4,893,021 A * 1/1990 Bollen et al. ................ 378/185
5,309,496 A * 5/1994 Winsor ...................... 378/98.2
6,002,743 A * 12/1999 Telemonde ................ 378/98.2

* cited by examiner

Primary Examiner—Drew Dunn
(74) Attorney, Agent, or Firm—Patrick J. Pinto

(57) ABSTRACT

An image receptor for an X-ray apparatus including a lead glass panel laminate that is directly coupled to at least one lens assembly with an optical adhesion material. Each lens assembly is directly coupled to an associated solid state image sensor by an optical adhesion material. Each solid state image sensor is in electrical communication with an integral mother board by way of a removable daughterboard. The motherboard includes through apertures for allowing the servicing of each lens assembly. The lens assembly includes a focus adjustment that allows a linear adjustment of the lens assembly while maintaining the electrical communication with the motherboard. The lead glass panel laminate further includes light directing properties in the form of at least one partitioning mask that is formed in its second surface. Each partitioning mask cooperates with light directing coatings that are applied to a top surface of a lead glass panel of the lead glass panel laminate.

39 Claims, 2 Drawing Sheets

IMAGE RECEPTOR FOR AN X-RAY APPARATUS

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

With regard to the classification of art, this invention is believed to be found in the general class pertaining to x-ray or gamma ray systems or devices and more particularly to image receptors for producing images from at least one digital camera.

2. Description of Related Art Including Information Disclosed Under 37 CFR 1.97 and 1.98

The acquisition of images using digital cameras is known. The known prior art includes U.S. Pat. No. 5,309,496 that issued to Winsor on May 3, 1994 and U.S. Pat. No. 6,002,743 that issued to the present inventor on Dec., 14, 2000. It has been determined that there is still a need for improvements to the known prior art. The identified needs include: a) further improvement to the directional control of the visible light by minimizing the scattering of rays within the receptor, b) improving the low light performance of the image receptor and c) providing individual focus adjustment for each camera when multiple cameras are arrayed in the image receptor. The present invention solves the identified needs while simultaneously providing an image receptor that has a relatively low profile. The low profile image receptor of the present invention includes novel improvements in its electro-mechanics while providing an integrally mounted and commonly connected motherboard.

SUMMARY OF THE INVENTION

The present invention may be briefly described with respects to its objects. It is an object of the present invention to provide and it does provide an image receptor having one of its lenses directly coupled to a solid state image sensor without interfering with electrical contacts of the solid state image sensor.

It is another object of the present invention to provide and it does provide an image receptor that includes multiple solid state sensors that allows individual focus adjustment of each lens assembly while maintaining electrical communication between each solid state sensor and a commonly connected motherboard.

It is still another object of the present invention to provide and it does provide at least one optical assembly that includes multiple lenses resulting in a low f-number optical design while minimizing reflections.

It is yet another object of the present invention to provide and it does provide an image receptor that includes at least one adjustable optical assembly having one of its lenses directly coupled to a solid state image sensor without interfering with electrical contacts of the solid state image sensor while simultaneously having a distal lens directly coupled to a lead glass panel.

It is still yet another object of the present invention to provide and it does provide an image receptor that includes a means for controlling the scattering of visible light rays passing through a lead glass panel by directing a majority of the visible light rays towards a solid state sensor associated therewith.

One embodiment of the present invention may be briefly described as: An image receptor for an X-ray apparatus having light directing properties including:

a) a lead glass panel having a first surface and a second surface, said first surface being coated with polarizing filter layer, said polarizing filter layer being coated with a phosphor layer, said phosphor layer being coated with a white pigment layer, said white pigment layer being coated with a black pigment layer, said second surface having at least one camera assembly directly coupled thereto; and wherein X-rays from an X-ray source travel first through the black pigment layer, then subsequently the X-rays pass through the white pigment layer to and towards the phosphor layer where the X-rays are converted to visible light rays, the visible light rays subsequently pass through the polarizing layer, then subsequently through the lead glass panel to and towards the camera assembly, said white pigment layer increasing a brightness of the visible light rays passing through the lead glass panel by reflecting a majority of the visible light rays towards the camera assembly.

A second embodiment of the present invention may be described as: An image receptor for an X-ray apparatus having light directing properties including:

a) a lead glass panel laminate having a top surface having an X-ray absorbing coating thereon and a second surface opposite thereto, a phosphor layer being intermediate said X-ray absorbing coating and a first surface of a lead glass panel member said phosphor coating for converting X-rays passing through the X-ray absorbing coating into visible light rays, said lead glass panel member including means for limiting the scattering of the visible light rays, said second surface having at least one camera assembly directly coupled thereto; and b) each camera assembly including a digital image sensor, a first lens and a second lens, said first lens being directly coupled to the second surface of the lead glass laminate, said second lens being directly coupled to its associated digital sensor; and c) wherein each camera assembly further including means for electrical communication with a commonly connected mother board and each camera assembly including individual focus adjustment, said individual focus adjustment allowing for movement of the second lens with respect to the first lens while maintaining said electrical communication with said common mother board or without removal of any components.

The embodiments described above may include one or more of the following improvements: a) a low profile design by providing an integrally mounted motherboard that includes apertures for allowing individual camera assemblies to pass therethrough while allowing easy servicing of the image receptors components; b) a geometric pattern being formed into a surface of the lead glass panel and filled with a black pigment for minimizing cross talk between adjacent camera assemblies. c) The polarizing filter layer may include properties for controlling the light exiting the phosphor layer from each lambertine emitter to within a 60 arc degree included angle and finally to the camera assembly. Any light outside the 60 arc degree included angle is reflected towards the white pigment layer and subsequently a portion of that reflected light is recycled through the polarizing filter assembly then finally to the camera assembly. These additional improvements as well as others identified below may be used individually or in combination with the embodiments of the present invention.

In addition to the above summary, the following disclosure is intended to be detailed to insure adequacy and aid in the understanding of the invention. However, this disclosure, showing particular embodiments of the invention, is not intended to describe each new inventive concept that may arise. These specific embodiments have been chosen to show at least one preferred or best mode of the present invention. These specific embodiments, as shown in the accompanying drawings, may also include diagrammatic symbols for the purpose of illustration and understanding

Figure 1:
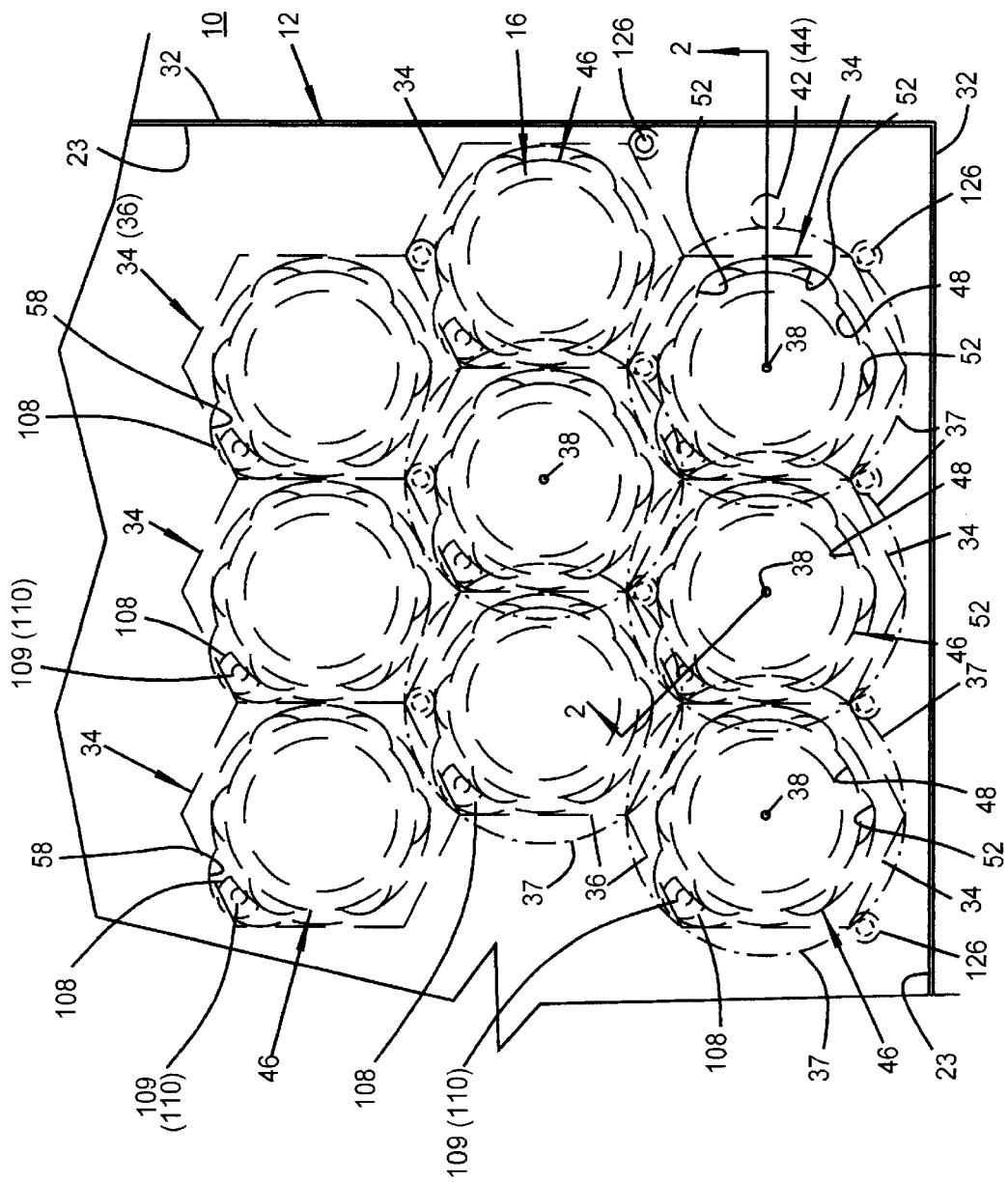
FIG. 1 represents a plan view of a portion of an image receptor of the present invention.

In the following description and in the appended claims, various details are identified by specific names for convenience. These names are intended to be generic in their application while differentiating between the various components or items. The corresponding reference numbers refer to like members throughout the several figures of the drawing.

The drawings accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Referring to the drawings, an image receptor of the present invention is generally identified as 10. Non-limiting typical applications for using this image receptor 10 are disclosed in U.S. Pat. No 6,002,743 that issued to the present inventor on Dec. 14, 1999. U.S. Pat. No. 6,002,743 is incorporated into this application by reference. The construction of the image receptor 10 of the present invention may be employed in conjunction with either an individual camera assembly or with multiple camera assemblies or arrayed in a redundant camera array. One non-limiting example of a redundant camera array may be more clearly seen in FIG. 1. Multiple camera assemblies and/or redundant arrays are employed in large format seamless X-rays prints and displays.

The image receptor 10 of the present invention includes a glass panel laminate 12, an optics mounting plate 14, at least one camera assembly 16 and a means for electrical communication 18.

The glass panel laminate 12 includes a lead glass panel 20 that further includes a first surface 22 and a second surface 24. The first surface 22 is coated with a polarizing filter layer 26. One non-limiting example of a polarizing filter layer is an emission shaping coating and the like. The polarizing filter layer 26 is covered with a phosphor layer 28. This combination improves the light gathering and directing capability of the imaging system. The phosphor layer 28 is coated with a white pigment layer 30. One non-limiting example of a white pigment layer 30 is a white paint. The white pigment layer 30 is coated with a black pigment layer 32. One non-limiting example of a black pigment layer is a black paint It is preferred that the black paint have properties which will also provide a top surface coating for protecting and minimizing damage to the white pigment layer 30 during normal use while simultaneously blocking ambient light from entering the imaging system. It is preferred that the side edges 33 of the glass plate laminate 12 be also coated with only the black pigment layer 32.

Figure 2:
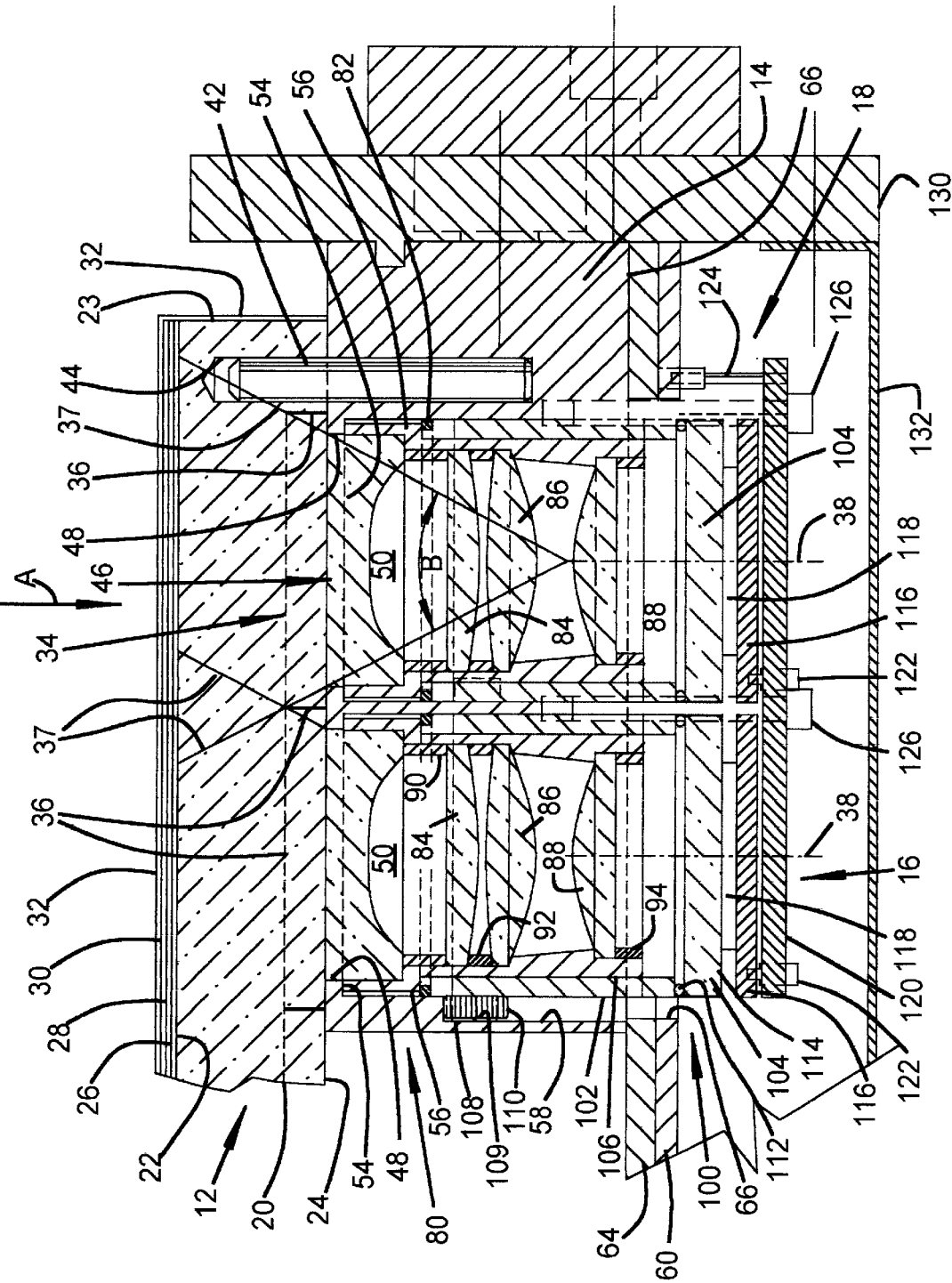
FIG. 2 represents a side sectional elevation of the image receptor of the present invention, this view is taken along line 2—2 of FIG. 1.

Referring in particular to FIG. 2, an X-ray beam travels from an X ray source in the direction of arrow A. The X-ray is absorbed by and passes through the black pigment layer 32. The X-ray beam continues in the direction of arrow A through the white pigment layer 30 then into the phosphor layer 28 where the X-ray beam is converted to a visible light rays. The white pigment layer 30 acts as a reflector to direct the visible light rays in a downward direction to and towards the lead glass panel or plate 20. The polarizing filter layer 26 then directs the reflected visible light rays to and towards the camera assembly 16 within a selected angular field of view as shown by arrow B. Any light traveling from the lambertine emitter particles within the phosphor layer beyond the selected angular field of view are reflected back to the white pigment layer then redirected and reflected in the direction of arrow B through the polarizing layer then to and towards the camera assembly 16. One non-limiting example of a selected angular field of view is an included angle B of between 40 and 70 arc degrees.

It is preferred that the image receptor 10 includes a partitioning mask 34. It is also preferred that the partitioning mask 34 be in the form of grooves 36 that are formed into the second surface 24 of the lead glass panel 20. One non limiting example of the grooves 36 is a 0.05 mm (0.002 in.) wide laser cut groove that is cut to a predetermined depth between 2.5 mm (0.100 in) and 3.5 mm (0.140 in.) in a lead glass panel that is in the neighborhood of 10.5 mm (0.413 in.) thick. Each geometrically shaped groove 36 is then filled with a black pigment filler such as a black ink epoxy and the like. It has been found that a honeycomb-like geometrical shape works very well in the redundant camera array shown in FIG. 1 and is maintained for the rest of the array. The honeycomb-like shape is derived by connecting intersect points of intersecting circles 37 that have their center at the axis 38 of each adjacent camera assembly 16. However it is to be noted that other suitable geometrical shapes may be used for the partitioning mask 34

The glass plate laminate 12 is adhered to an optics mounting plate 14 by a suitable optical grade adhesive. One non-limiting example of a suitable optical grade adhesive is a thin double-sided optical grade adhesive film. It is preferred that the adhesive film include a protective peel off layer that is removable at the time of application and/or assembly. The glass plate laminate 12 and the optics mounting plate 14 are aligned is a selected relationship by using dowel pins 42 that are selectively located in the optics mounting plate 14 and are inserted into mating apertures 44 in the glass plate laminate 12 so that through apertures 46 in the optics mounting plate 14 and the attached adhesive film are aligned with the partitioning masks 34 of the glass panel 20. Each of the through apertures 46 have a generally circular profile 48 that is sized for closely mating with a first lens 50 of the camera assembly 16. It is preferred that each of the through apertures 46 further includes a plurality of scallop shaped portions 52. It has been found that 6 scallops evenly spaced at 60 degree intervals on the circumference of the aperture 46 provides the desired results. The through apertures 46 further include a shelf portion 54 that is formed by counterboring the through aperture 46 to a selected diameter and a selected depth. The selected diameter of the shelf portion 54 mates with a barrel member 56 of the camera assembly 16 with a predetermined fit or allowance. Each of the through apertures 46 also includes a notched recess 58 having a selected depth associated therewith. The purpose of these scalloped shaped portions 52, the shelf portion 54, and the notched recess 58 will be discussed below. It is preferred that the optics mounting plate 14 be made of a suitable metal material when used in conjunction with redundant arrays of camera assemblies 16. One non-limiting example of a suitable material is an aluminum jig or tooling plate that remains stable and flat after performing machining operations thereon. It is also preferred that all surfaces of the optics mounting plate 14 be plated with a black coating. One non-limiting example of a coating for an aluminum plate is a black anodize and the like.

A perforate printed circuit board or mother board 60 is removably fastened to a surface 62 of the optics mounting plate 14 that is distal to the lead glass panel 20. A matching insulating spacer member 64 is placed between the optics mounting plate 14 and the motherboard 60. The spacer member 64 insulates the circuitry on the mother board from the optics mounting plate 14 as well as acting as a shim for providing an selected overall thickness of the assembly of the glass plate laminate 12, the optics mounting plate 14 and the mother board 60. It has been found that a set of insulating spacer members 64, i.e., 0.5 mm (0.020 in.); 0.63 mm (0.025 in.) and 1.26 mm (0.050 in.) have satisfied most conditions by being used individually or in combination to provide the desired overall thickness of the assembly. The perforations or clearance apertures 66 in the motherboard 60 and the spacers must be aligned with the through apertures 46 in the optics mounting plate 14. In addition to the wiring paths, the mother board 60 may include slots for memory cards, central processing units, and the like.

A stationary portion 80 of each camera assembly 16 includes the barrel member 56 that houses the first lens 50. First, a predetermined quantity of optical adhesion material is applied to a flat surface of the first lens 50. Non limiting examples of the optical adhesion material are and optical grease; an optical adhesive having a close refractive match; and the like. Subsequently, the stationary portion 80 is seated into the through aperture 46 so that the flat surface of the lens abuts the second surface 24 of the lead glass panel 12 while the barrel 56 is seated against the shelf portion 54. In a preferred embodiment an optical grease is uniformly dispersed between the flat surface of the first lens 50 and the second surface 24 absent any voids or bubbles. Any excess optical grease will flow into the scalloped shaped portions 52 of the through apertures 46. The stationary portion 80 is removably retained in the optics mounting plate 14 by way of a retaining ring 82. The stationary portion also houses a first intermediate lens 84, a second intermediate lens 86 and a third intermediate lens 88. Each of the lens 82, 84 86 and 88 are selectively positioned and retained in the barrel member 56 by and with a first tubular retainer and spacer 90, a second tubular retainer and spacer 92, and a third tubular retainer and spacer 94.

As a non-limiting example, it has been found that making the first lens 50 and the second lens 104 of a optical grade glass material has provided the desired results. The first intermediate lens 84, the second intermediate lens 86 and the third intermediate lens 88 may be molded or formed from a optical grade plastic material. It is anticipated that the lenses of the present invention may be made of materials other than noted in the above example.

Each camera assembly 16 includes a movable or adjustable portion 100 that includes an optics housing member 102, and a second lens 104. The interior diameter 106 of the optics housing 102 is sized to slideably and closely fit over the exterior of a reduced diameter portion 106 of the barrel member 56. The optics housing member 102 further includes a protruding ear or lug 108 that includes a threaded aperture 109. A jacking setscrew 110 is threaded into the threaded aperture 109. The second lens 104 is seated in a counterbore or recess at one end of the optics housing member 102. An elastomer ring 112 is positioned between the second lens 104 and a shoulder of the counterbore or recess. An initial focus adjustment is provided by selective compression of this elastomer ring 112.

An exposed surface 114 of the second lens 104 is uniformly coated with a predetermined quantity of an optical grease. Subsequently a chip carrier board 116 carrying a solid state sensor or chip 118 is positioned and placed in contact with the exposed surface 114 and retained therein by means of the optical grease. The wire bonds of the solid state chip are arranged along its perimeter and may include post processing circuitry. This arrangement of the wire bonds allows the exposed surface 114 of the second lens 104 that is coated with the optical grease to directly contact the solid state sensor without interfering with the wire bonds. A daughter board 120 is electrically connected to the chip carrier board 116 by a plurality of a first male-female disconnect or pin arrangement 122. In a redundant camera arrangement, it has been found that is possible to make the daughter board 120 in a quad-style array so that connection is simultaneously made with four of the chip carrier boards 116. Each daughter board 120 in turn is aligned with and placed in electrical communication with the motherboard 60 by a plurality of a second male-female disconnect or pin arrangement 124. The second disconnect 124 should a sufficient length for maintaining electrical contact while allowing a small amount of relative movement between each daughter board 120 and the commonly connected motherboard 60. Each daughter board 120 is removably retained in the image receptor 10 by threaded fasteners or screws 126 that are threaded into the optics mounting plate 14. The initial adjustment noted above is performed at this time by the selective compression of each elastomer ring 112 by the threaded fastener 126 associated therewith.

The image receptor 10 of the present invention allows each camera assembly to be individually adjusted or focused without affecting any other camera. Each camera assembly may be individually focused by compression of the elastomer ring 112 and/or by the turning the jacking setscrew 110 in a selected direction for the advancement or retraction of its nose portion. The nose portion of the setscrew 110 abuts the shelf of the notched recess 58. The jacking screw 110 preferably is a self-locking type for maintaining its adjustment. One non-limiting example of a suitable tool for advancing or retracting the setscrew 110 is as an Allen wrench, a Torx wrench and the like. Of course the adjustment tool must be compatible with the head of the jacking screw 110. The adjustment tool is inserted into adjustment apertures that are formed and aligned in the daughter board 120, the chip carrier 116 and the motherboard 60. It has been found that after an initial or coarse positioning of the first lens 50 with respect to the second lens 104. The individual adjustment need only be in the neighborhood of 0.75 mm (0.030 in). The elastomer ring 112 acts a resilient cushion between the second lens 104 and the shoulder of the counterbore or seat of the optics housing member 102. The focal adjustment may be characterized as being linear because the relative movement of the movable portion 100 with respect to the stationary portion 80 is substantially linear. The protruding ear 108 also acts as an anti-rotation means when seated in the notched recess 58.

The image receptor 10 of the present invention may be installed in new x-ray apparatus or retrofit into existing x-ray apparatus by modifying the mounting frame assembly 130. The image receptor 10 of the present invention allows for the easy service and routine maintenance of the components as and when needed by only removing the daughter board 120 to access the chip carrier board 116. Since the motherboard 60 includes clearance apertures 66, each moveable portion 100 may be removed from the image receptor for service without removing the motherboard 60.

The optical grease discussed above is commercially available and acts to maintain contact of the abutting flat surfaced components while minimizing optical distortion while maintaining serviceability.

As previously mentioned, the image receptor 10 of the present may be used in a redundant array. One non-limiting example of a redundant array for a single lead glass panel 20 that is 43.8 cm (17.25 in.) square requires the following components: 400 honeycomb like partition mask cells 34; One (1) optics mounting panel 14; at least one (1) spacer member 64; 400 camera assemblies 16; 400 chip carrier boards; 100 quad-style daughter boards 120; and one (1) motherboard 60. The camera assemblies 116 are spaced in a staggered honeycomb array, as seen in FIG. 1, at 21.6 mm (0.850 in) center to center intervals in both directions.

The bottom of the image 10 is closed by a bottom panel or cover member 132 that is removably fastened to the mounting frame assembly 130.

It is to be noted that the barrel member 50; the optics housing member 102, the first tubular retainer 90, the second tubular retainer 92; and the third tubular retainer member 94 should be made from materials having a matte black finish or coated with a matte black coating.

Directional terms such as "front", "back", "in", "out", downward, upper, lower and the like may have been used in the description. These terms are applicable to the embodiments shown and described in conjunction with the drawings. These terms are merely used for the purpose of description in connection with the drawings and do not necessarily apply to the position in which the present invention may be used.

While these particular embodiments of the present invention have been shown and described, it is to be understood that the invention is not limited thereto and protection is sought to the broadest extent that the prior art allows.

What is claimed is:

1. An image receptor for an X-ray apparatus having light directing properties including:
    a) a lead glass panel having a first surface and a second surface, said first surface being coated with polarizing filter layer, said polarizing filter layer being coated with a phosphor layer, said phosphor layer being coated with a white pigment layer, said white pigment layer being coated with a black pigment layer, said second surface having at least one camera assembly directly coupled thereto; and
    wherein X-rays from an X-ray source travel first through the black pigment layer, then subsequently the X-rays pass through the white pigment layer to and towards the phosphor layer where the X-rays are converted to visible light rays, the visible light rays subsequently pass through the polarizing layer, then subsequently through the lead glass panel to and towards the camera assembly, said white pigment layer increasing a brightness of the visible light rays passing through the lead glass panel by reflecting a majority of the visible light rays towards the camera assembly.

2. An image receptor as recited in claim 1 wherein the second surface of the lead glass panel includes at least one partitioning mask, each partitioning mask having a selected geometrical outline, each partitioning mask being formed as groove having a selected width and depth into said second surface and said groove being filled with a black pigment for limiting the scattering of visible light rays to any adjacent camera assembly.

3. An image receptor as recited in claim 1 wherein said polarizing layer directs a majority of the visible light rays passing therethrough to and towards each camera assembly within a selected angular field of view.

4. An image receptor as recited in claim 1 wherein said lead glass panel further includes edge surfaces and each of said edge surfaces are fully covered with a black pigmented material for absorbing any visible light rays not directed towards the camera assembly.

5. An image receptor as recited in claim 3 wherein the selected angular field of view is an included angle of less than 50 arc degrees.

6. An image receptor as recited in claim 2 wherein said polarizing layer directs a majority of the visible light rays passing therethrough to and towards each camera assembly mounted thereunder and within a selected angular field of view.

7. An image receptor as recited in claim 4 wherein said polarizing layer directs a majority of the visible light rays passing therethrough to and towards each camera assembly mounted thereunder and within a selected angular field of view.

8. An image receptor as recited in claim 4 wherein the selected angular field of view is an included angle of less than 50 arc degrees.

9. An image receptor as recited in claim 1 wherein said black pigment layer includes properties for minimizing damage to the white pigment layer.

10. An image receptor as recited in claim 2 wherein said black pigment layer includes properties for minimizing damage to the white pigment layer.

11. An image receptor as recited in claim 3 wherein said black pigment layer includes properties for minimizing damage to the white pigment layer.

12. An image receptor as recited in claim 4 wherein said black pigment layer includes properties for minimizing damage to the white pigment layer.

13. An image receptor as recited in claim 5 wherein said black pigment layer includes properties for minimizing damage to the white pigment layer.

14. An image receptor for an X-ray apparatus having light directing properties including:
    a) a lead glass panel laminate having a top surface having an X-ray absorbing coating thereon and a second surface opposite thereto, a phosphor layer being intermediate said X-ray absorbing coating and a first surface of a lead glass panel member said phosphor coating for converting X-rays passing through the X-ray absorbing coating into visible light rays, said lead glass panel member including means for limiting the scattering of the visible light rays, said second surface having at least one camera assembly directly coupled thereto; and
    each camera assembly including a digital image sensor, a first lens and a second lens, said first lens being directly coupled to the second surface of the lead glass laminate, said second lens being directly coupled to its associated digital sensor; and c) wherein each camera assembly further including means for electrical communication with a common mother board and each camera assembly including individual focus adjustment, said individual focus adjustment allowing for movement of the second lens with respect to the first lens while maintaining said electrical communication with said common mother board.

15. An image receptor as recited in claim 14 wherein said first lens is directly coupled to the second surface by and with a first predetermined quantity of an optical adhesion material.

16. An image receptor as recited in claim 14 wherein said second lens is directly coupled to the digital image sensor by and with a second predetermined quantity of an optical adhesion material.

17. An image receptor as recited in claim 15 wherein said second lens is directly coupled to the digital image sensor by and with a second predetermined quantity of the optical adhesion material.

18. An image receptor as recited in claim 14 wherein said second lens is directly coupled to the digital image sensor associated therewith and said means for electrical communication simultaneously includes wire bonds that are arrayed along the perimeter of the digital image sensor.

19. An image receptor as recited in claim 14 wherein said means for electrical communication further includes a digital image sensor carrier that is positioned intermediate the digital image sensor and the common motherboard.

20. An image receptor as recited in claim 17 wherein said means for electrical communication further includes a digital image sensor carrier that is positioned intermediate the digital image sensor and the common motherboard.

21. An image receptor as recited in claim 18 wherein said means for electrical communication further includes a digital image sensor carrier that is positioned intermediate the digital image sensor and the common motherboard.

22. An image receptor as recited in claim 17 wherein said means for electrical communication further includes a daughterboard that is removably positioned intermediate a digital image sensor carrier and the mother board, said digital image sensor carrier being in electrical communication with said daughterboard and said daughterboard being in electrical communication with said common mother board while allowing relative movement therebetween.

23. An image receptor as recited in claim 18 wherein said means for electrical communication further includes a daughterboard that is removably positioned intermediate a digital image sensor carrier and the mother board, said digital image sensor carrier being in electrical communication with said daughterboard and said daughterboard being in electrical communication with said common mother board while allowing relative movement therebetween.

24. An image receptor as recited in claim 19 wherein said means for electrical communication further includes a daughterboard that is removably positioned intermediate the digital image sensor carrier and the mother board, said digital image sensor carrier being in electrical communication with said daughterboard and said daughterboard being in electrical communication with said common mother board while allowing relative movement therebetween.

25. An image receptor as recited in claim 14 wherein said motherboard includes at least one through aperture that is formed therein, each through aperture being aligned with its associated camera assembly and being sized and shaped for allowing a selected portion of a its associated camera assembly to protrude through said common motherboard.

26. An image receptor as recited in claim 15 wherein said motherboard includes at least one through aperture that is formed therein, each through aperture being aligned with its associated camera assembly and being sized and shaped for allowing a selected portion of a its associated camera assembly to protrude through said common motherboard.

27. An image receptor as recited in claim 17 wherein said motherboard includes at least one through aperture that is formed therein, each through aperture being aligned with its associated camera assembly and being sized and shaped for allowing a selected portion of a its associated camera assembly to protrude through said common motherboard.

28. An image receptor as recited in claim 19 wherein said motherboard includes at least one through aperture that is formed therein, each through aperture being aligned with its associated camera assembly and being sized and shaped for allowing a selected portion of a its associated camera assembly to protrude through said common motherboard.

29. An image receptor as recited in claim 22 wherein said motherboard includes at least one through aperture that is formed therein, each through aperture being aligned with its associated camera assembly and being sized and shaped for allowing a selected portion of a its associated camera assembly to protrude through said common motherboard.

30. An image receptor as recited in claim 14 wherein a first optical surface of said first lens is flat and said first optical surface is directly coupled to said second surface by and with a predetermined quantity of an optical adhesion material.

31. An image receptor as recited in claim 15 wherein a flat optical surface of said second lens is directly coupled to said associated digital sensor by and with a predetermined quantity of an optical adhesion material.

32. An image receptor as recited in claim 14 wherein a first optical surface of said first lens is flat and said first optical surface is directly coupled to said second surface by and with a first predetermined quantity of an optical adhesion material and a flat optical surface of said second lens is directly coupled to said associated digital sensor by and with a second predetermined quantity of an optical adhesion material.

33. An image receptor as recited in claim 14 wherein said individual focus adjustment includes an elastomer ring member that is selectively compressible by said second lens during said individual focus adjustment.

34. An image receptor as recited in claim 14 wherein said first lens and said second lens are formed of a glass material.

35. An image receptor as recited in claim 15 wherein said first lens and said second lens are formed of a glass material.

36. An image receptor as recited in claim 16 wherein said first lens and said second lens are formed of a glass material.

37. An image receptor as recited in claim 14 which further includes at least one intermediate lens member between the first lens and the second lens and wherein said first lens and said second lens are formed of a glass material and the intermediate lenses are formed of a plastic material.

38. An image receptor as recited in claim 15 which further includes at least one intermediate lens member between the first lens and the second lens and wherein said first lens and said second lens are formed of a glass material and the intermediate lenses are formed of a plastic material.

39. An image receptor as recited in claim 16 which further includes at least one intermediate lens member between the first lens and the second lens and wherein said first lens and said second lens are formed of a glass material and the intermediate lenses are formed of a plastic material.

* * * * *